United States Patent
Baek et al.

(10) Patent No.: US 9,032,469 B2
(45) Date of Patent: May 12, 2015

(54) MEDIA PLAYBACK APPARATUS AND METHOD FOR PROVIDING MULTIMEDIA CONTENT USING THE SAME

(75) Inventors: Wonjang Baek, Seongnam-si (KR); John Kim, Seoul (KR); Seong Baek Lee, Seoul (KR)

(73) Assignee: SK Planet Co., Ltd., Seoul (KR)

( * ) Notice: Subject to any disclaimer, the term of this patent is extended or adjusted under 35 U.S.C. 154(b) by 697 days.

(21) Appl. No.: 12/216,280

(22) Filed: Jul. 2, 2008

(65) Prior Publication Data

US 2009/0013370 A1    Jan. 8, 2009

(30) Foreign Application Priority Data

Jul. 6, 2007    (KR) .................. 10-2007-0067845

(51) Int. Cl.
*H04N 7/173* (2011.01)
*H04N 7/16* (2011.01)
*H04N 21/258* (2011.01)
*H04N 21/426* (2011.01)
*H04N 21/432* (2011.01)
*H04N 21/234* (2011.01)

(52) U.S. Cl.
CPC ...... *H04N 7/17318* (2013.01); *H04N 21/23412* (2013.01); *H04N 21/25816* (2013.01); *H04N 21/25875* (2013.01); *H04N 21/42646* (2013.01); *H04N 21/4325* (2013.01)

(58) Field of Classification Search
CPC .................. H04N 21/42646; H04N 21/23412
USPC .................................................. 725/133, 142
See application file for complete search history.

(56) References Cited

U.S. PATENT DOCUMENTS

| 7,457,532 | B2 * | 11/2008 | Barde et al. ................ 386/248 |
| 7,528,890 | B2 * | 5/2009 | Staker et al. ................ 348/592 |
| 7,639,923 | B2 * | 12/2009 | Ikeda et al. ................ 386/335 |
| 7,716,699 | B2 * | 5/2010 | Evans et al. ................ 725/31 |
| 2003/0018751 | A1 | 1/2003 | Lee et al. ................ 709/219 |
| 2003/0152366 | A1 * | 8/2003 | Kanazawa et al. ........... 386/69 |
| 2003/0161615 | A1 * | 8/2003 | Tsumagari et al. .......... 386/95 |
| 2003/0180032 | A1 | 9/2003 | Barde et al. ................ 386/55 |
| 2004/0218900 | A1 | 11/2004 | Yoon et al. ................ 386/46 |
| 2005/0091688 | A1 * | 4/2005 | Chang et al. ................ 725/60 |
| 2005/0201725 | A1 * | 9/2005 | Braun et al. ................ 386/68 |

(Continued)

FOREIGN PATENT DOCUMENTS

| CN | 1701607 A | 11/2005 |
| EP | 1 309 205 A1 | 5/2003 |

(Continued)

OTHER PUBLICATIONS

Korean Notice of Allowance issued Jan. 29, 2009, issued to corresponding Korean Application No. 10-2007-0067845.

(Continued)

*Primary Examiner* — Nasser Goodarzi
*Assistant Examiner* — Franklin Andramuno
(74) *Attorney, Agent, or Firm* — Stein IP, LLC

(57) ABSTRACT

A media playback apparatus and a method for providing a multimedia content using the same are disclosed. In accordance with the apparatus and the method, a content reception information stored in a disk media is read and a connection to an external apparatus is established based on the content reception information to receive and provide the multimedia content.

12 Claims, 3 Drawing Sheets

(56) References Cited

U.S. PATENT DOCUMENTS

| | | | |
|---|---|---|---|
| 2006/0140091 A1* | 6/2006 | Iwamoto et al. | 369/53.2 |
| 2006/0271440 A1* | 11/2006 | Spinucci et al. | 705/14 |
| 2007/0100966 A1 | 5/2007 | Peng et al. | 709/219 |
| 2007/0143815 A1* | 6/2007 | Choi et al. | 725/134 |
| 2007/0174303 A1* | 7/2007 | Fleming et al. | 707/100 |
| 2008/0137507 A1* | 6/2008 | Sun et al. | 369/85 |

FOREIGN PATENT DOCUMENTS

| | | |
|---|---|---|
| JP | 2001-101006 A | 4/2001 |
| KR | 2003-0006643 A | 1/2003 |
| KR | 10-2004-0094210 A | 11/2004 |
| KR | 10-2006-0123317 A | 12/2006 |
| WO | WO 02/50744 A3 | 6/2002 |
| WO | WO 2004/053840 A3 | 6/2004 |

OTHER PUBLICATIONS

International Search Report issued Nov. 14, 2008, issued to International Application No. PCT/KR2008/003965.

Korean Office Action issued Aug. 21, 2008, issued to corresponding Korean Application No. 10-2007-0067845.

European Search Report issued Aug. 3, 2013, issued to European Application No. 08778628.1.

Chinese Office Action issued Apr. 25, 2011, issued to Chinese Application No. 200880023553.1.

Chinese Office Action issued Jan. 23, 2013, issued to Chinese Application No. 200880023553.1.

* cited by examiner

<Prior Art>

MEDIA PLAYBACK APPARATUS AND METHOD FOR PROVIDING MULTIMEDIA CONTENT USING THE SAME

BACKGROUND OF THE INVENTION

1. Field of the Invention

The present invention relates to a media playback apparatus and a method for providing a multimedia content using the same, and more particularly to a media playback apparatus and a method for providing a multimedia content using the same wherein a content reception information stored in a disk media is read and a connection to an external apparatus is established based on the content reception information to receive and provide the multimedia content.

2. Description of the Related Art

A broadcasting service provider makes a large investment in order to provide a conventional broadcasting service. For instance, the broadcasting service provider should have a permit for broadcasting, equipments and broadcasting networks for a transmission of broadcasting signals. The broadcasting service provider should also have personnel for providing the broadcasting service.

In addition, as a transition from an analog broadcasting to a digital broadcasting is carried out, the broadcasting service provider should make more investments in order to provide the digital broadcasting.

Therefore, the conventional broadcasting service is provided by a large corporation or a public company having a large amount of funds.

Moreover, in order to provide the broadcasting service for specific users other than a general viewer, the broadcasting service provider should make a large investment.

An example of the broadcasting service for the specific users is an internal corporate broadcasting service of a corporation having a plurality of branches.

That is, the internal corporate broadcasting service is for providing the broadcasting service to workers or customers of a bank, a security corporation or a company having a plurality of divisions.

A system for providing the conventional broadcasting service comprises a configuration for creating, operating and transmitting the internal corporate broadcasting, and a configuration for receiving and providing the internal corporate broadcasting.

FIG. 1 is a block diagram illustrating a conventional system for providing an internal corporate broadcasting service.

As shown, the conventional system for providing the internal corporate broadcasting service comprises a head-end system 110 and receivers 130a and 130b.

For instance, a headquarter has the head-end system 110 for creating, operating and transmitting the internal corporate broadcasting. Branches have the receivers 130a and 130b for receiving and providing the internal corporate broadcasting.

The receivers 130a and 130b are generally custom-made in order to receive the internal corporate broadcasting for instance, the receivers 130a and 130b In addition, the internal corporate broadcasting service is transmitted through a satellite network 150a or a dedicated network 150b. In order to provide the broadcasting service, a stable bandwidth should be secured. Therefore, the expensive satellite network 150a or a dedicated network 150b guaranteeing a QoS is used.

As described above, the broadcasting service provider should make the large investment in order to provide the broadcasting service for the specific users as well as the general broadcasting service.

Therefore, the broadcasting service for the specific users is employed only for some corporations.

On the other hand, an optical disk is a circular disk having thereon a data wherein an information of an audio or a video is converted into a digital code to be stored thereon. The data is read by measuring a strength of a reflective laser beam. Conventional optical disks includes a CD (Compact Disc), a DVD (Digital Versatile Disc) and an LD (laserdisc).

However, it is difficult to store a video data of a high capacity in the conventional optical disk as a HD (Hi-Definition) broadcasting is becoming popular. Therefore, a specification for a next generation optical disk is being developed.

A specification including a HD-DVD and a Blu-ray disk has been proposed as the next generation optical disk.

The HD-DVD follows a structure of the DVD to ensure a compatibility and also offers a definition higher than that of the DVD. The HD-DVD utilizes a blue laser having a wavelength of 405 nm instead of a red laser having a wavelength of 650 nm and has a capacity of 15 GB for a single layer disk and 30 GB for a dual layer disk.

While the Blu-ray disk uses the blue laser having the wavelength of 405 nm similar to the HD-DVD, the Blu-ray disk is advantageous over the HD-DVD in that the Blu-ray disk has the capacity of 25 GB for the single layer disk and 50 GB for the dual layer disk. Moreover, the Blu-ray disk is capable of having a quad-layer or an octa-layer wherein the capacity is expanded to 100 GB-200 GB.

Particularly, as the Blu-ray disk and the HD-DVD compliant to a specification of the next generation optical disk are popularized, an HD video is expected to be enjoyed easily, and a storage of a large amount of data is possible.

Hereinafter, a "disk storage media" refers to the next generation storage media such as the Blu-ray disk and the HD-DVD as well as the conventional storage media such as the CD, the DVD and the LD that is capable of storing a multimedia content such as the video data and an audio data. In addition, an apparatus for reading a data stored in the disk storage media is referred to as a "disk media playback apparatus".

SUMMARY OF THE INVENTION

It is an object of the present invention to provide a media playback apparatus and a method for providing a multimedia content using the same wherein a content reception information stored in a disk media is read and a connection to an external apparatus is established based on the content reception information to receive and provide the multimedia content.

In accordance with a first aspect of the present invention, there is provided a disk media playback apparatus, comprising: a content reception information reader for reading a content reception information from a disk storage media for storing the content reception information; a communication interface for establishing a communication connection with an external content providing apparatus based on the content reception information read by the content reception information reader, and for receiving a multimedia content corresponding to the content reception information; and a content provider for processing the multimedia content.

Preferably, the content reception information includes a network identification information of the content providing apparatus, and the communication interface establishes the communication connection with the content providing apparatus based on the network identification information.

Preferably, the content reception information includes an authentication information, the communication interface transmits the authentication information to the content providing apparatus.

Preferably, the content reception information includes a viewer identification information, and the communication interface transmits the viewer identification information to the content providing apparatus.

Preferably, the content reception information includes a content identification information of the multimedia content, and the communication interface transmits the content identification information to the content providing apparatus.

Preferably, disk media playback apparatus in accordance with the present invention may further comprise an identification information storage for storing a device identification information or a user identification information of the disk media playback apparatus, and the communication interface transmits the device identification information or the user identification information to the content providing apparatus.

Preferably, the disk media storage supports one of a DVD specification, a Blu-ray specification and a HD-DVD specification.

Preferably, the multimedia content includes the data application, and the content provider executes and provides the data application.

Preferably, the data application includes a scene resource data independently executable scene-by-scene, the communication interface receives the scene resource data, and the content provider executes and provides the scene resource data.

Preferably, the scene resource data includes an execution code and a resource data.

There is also provided a method for providing a multimedia content using a disk media playback apparatus, the multimedia content comprising a video data, an audio data and a data application, the method comprising steps of: (a) reading a content reception information from a disk media storage; (b) establishing a communication connection with an content provider based on the content reception information; (c) receiving the multimedia content from the content provider including the data application divided into a plurality of scene resource data independently executable scene-by-scene; and (d) providing the video data and the audio data included in the multimedia content received in the step (c) and processing the data application included in the multimedia content received in the step (c) by independently executing the plurality of scene resource data scene-by-scene.

Preferably, the content reception information includes a network identification information of the content providing apparatus, and the step (b) comprises establishing the communication connection with the content providing apparatus based on the network identification information.

Preferably, the content reception information includes an authentication information, and the step (b) comprises transmitting the authentication information to the content providing apparatus.

Preferably, the content reception information includes a viewer identification information, and the step (b) comprises transmitting the viewer identification information to the content providing apparatus.

The method in accordance with the present invention may further comprise (e) storing a device identification information or a user identification information of the disk media playback apparatus, and the step (b) comprises transmitting the device identification information or the user identification information to the content providing apparatus.

Preferably, the content reception information includes a content identification information of the multimedia content, and the step (b) comprises transmitting the content identification information to the content providing apparatus.

Preferably, the disk media storage supports one of a DVD specification, a Blu-ray specification and a HD-DVD specification.

Preferably, the scene resource data includes an execution code and a resource data.

DETAILED DESCRIPTION OF THE INVENTION

The present invention will now be described in detail with reference to the accompanied drawings. The interpretations of the terms and wordings used in Description and Claims should not be limited to common or literal meanings. The embodiments are provided for the skilled in the art to more completely understand the present invention.

Figure 1:
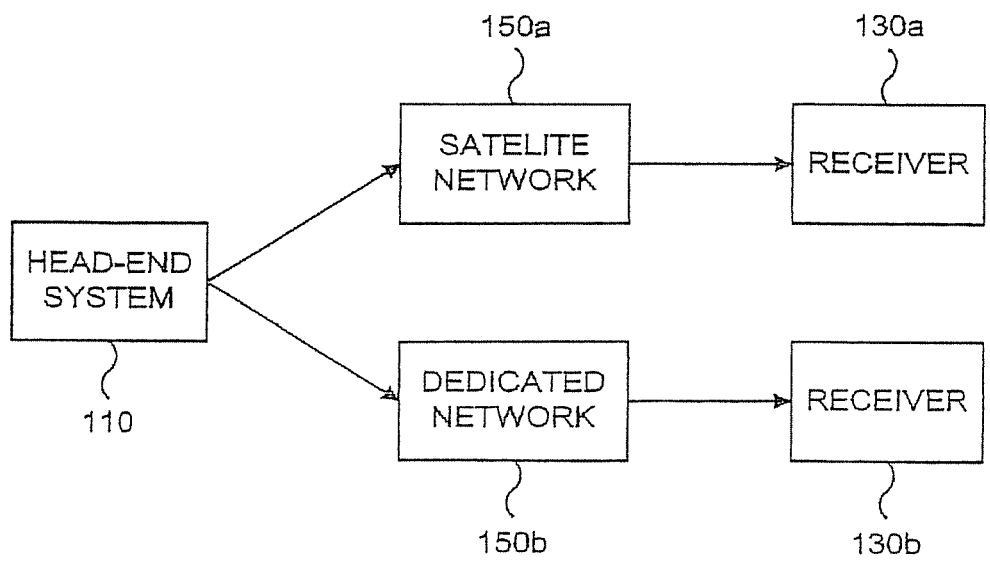
FIG. 1 is a block diagram illustrating a conventional system for providing an internal corporate broadcasting service.
Figure 2:
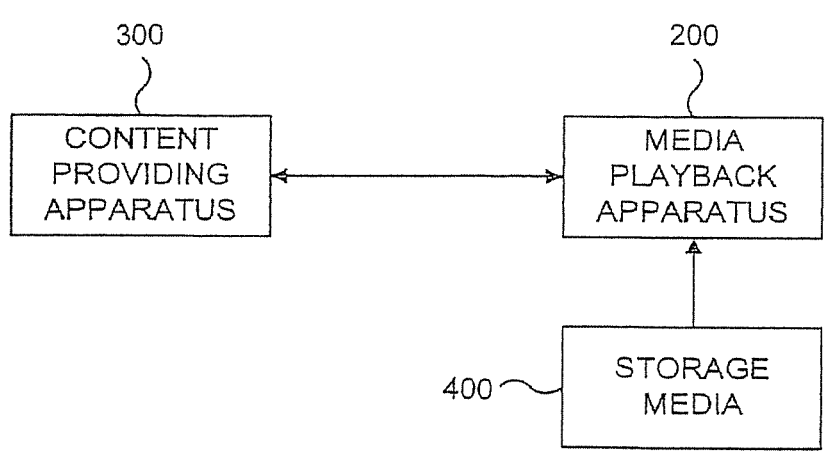
FIG. 2 is a block diagram exemplifying a multimedia content providing environment based on a disk media playback apparatus in accordance with the present invention.

FIG. 2 is a block diagram exemplifying a multimedia content providing environment based on a disk media playback apparatus in accordance with the present invention.

As shown, the multimedia content providing environment based on the disk media playback apparatus comprises the disk media playback apparatus 200, a content providing apparatus 300 and a disk media storage 400.

The disk media storage 400 stores a content reception information required for the disk media playback apparatus 200 to receive the multimedia content from the content providing apparatus 300.

The disk media storage 400 is an optical disk storage media including a next storage media such as a Blu-ray disk and a HD-DVD disk as well as a CD, a DVD and an LD, which stores the content reception information.

The disk media playback apparatus 200 reads the content reception information stored in the disk media storage 400, and establishes a communication connection with the content providing apparatus 300. The disk media playback apparatus 200 also receives and provides the multimedia content received from the content providing apparatus 300.

That is, while the conventional disk media playback apparatus simply reproduces the content stored in the CD or DVD, the disk media playback apparatus 200 in accordance with the present invention may reproduce the multimedia content received from the content providing apparatus 300.

The content providing apparatus 300 stores the plurality of multimedia contents and transmits the multimedia content selected from the plurality of multimedia contents to the disk media playback apparatus 200 according to a request from the disk media playback apparatus 200. the content providing apparatus 300 may establish the communication connection via a communication network such as the Internet.

A detailed description of the disk media playback apparatus is given below with reference to FIG. 3.

Figure 3:
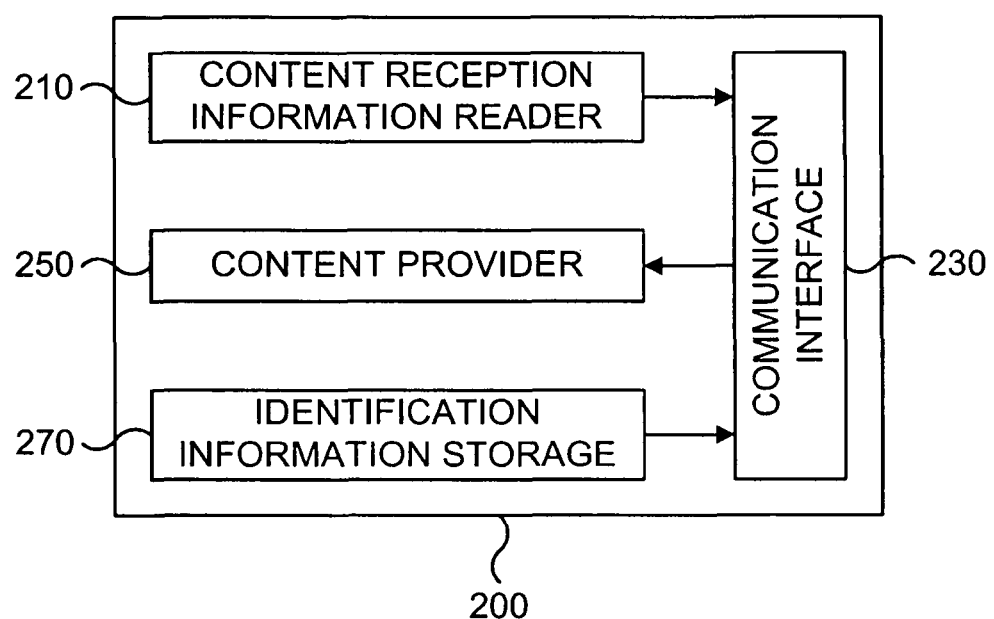
FIG. 3 is a block diagram exemplifying a disk media playback apparatus in accordance with the present invention.

FIG. 3 is a block diagram exemplifying a disk media playback apparatus in accordance with the present invention.

Referring to FIG. 3, the disk media playback apparatus 200 comprises a content reception information reader 210, a communication interface 230 and a content provider 250. in addition, the disk media playback apparatus 200 may further comprise a identification information storage 270.

The content reception information reader 210 reads the content reception information stored in the disk media storage 400.

The content reception information for receiving the multimedia content via the communication connection with the content providing apparatus 300 is stored in the disk media storage 400.

The communication interface 230 establishes the communication connection with the external content providing apparatus 300 based on the content reception information read by the content reception information reader 210. In addition, the communication interface 230 receives the multimedia content corresponding to the content reception information transmitted from the content providing apparatus 300.

A detailed description of the communication interface 230 is described below in detail.

As described above, the content reception information is for receiving the multimedia content trough the communication connection with the content providing apparatus 300.

Therefore, the content reception information may include a network identification information of the content providing apparatus 300.

For instance, the content reception information may include an information such as a network address of the content providing apparatus 300 as the network identification information.

When the content reception information includes the network identification information of the content providing apparatus 300, the communication interface 230 may establish the communication connection with the content providing apparatus 300 based on the network identification information.

In addition, the content reception information includes an authentication information for an authentication at the content providing apparatus 300. That is, when the content providing apparatus 300 transmits the multimedia content to an authenticated user, the disk media playback apparatus 200 in accordance with the present invention requires the authentication information in order to receive the multimedia content from the content providing apparatus 300.

Therefore, the disk media storage 400 may store the content reception information including the authentication information, and the content reception information reader 210 may read the authentication information from the disk media storage 400.

When the authentication information is read by the content reception information reader 210, the communication interface 230 may transmit the authentication information to the content providing apparatus 300.

Accordingly, the content providing apparatus 300 may carry out an authentication process to transmit the multimedia content to the disk media playback apparatus 200 in accordance with the present invention.

The content reception information may include a viewer identification information in order to facilitate a selection of the multimedia content at the content providing apparatus 300.

For instance, the content providing apparatus 300 may transmit the multimedia content selected from plurality of multimedia contents to the disk media playback apparatus 200 in order to provide a personalized multimedia content. The content reception information may include the viewer identification information in order to provide a criteria for selecting the multimedia content.

The viewer identification information may include an ID of the viewer when the multimedia content is provided to the specific users. However, the viewer identification information may include an identification information for statistics at the content providing apparatus 300 when the multimedia content is provided to unspecific users. For instance, when a party running the content providing apparatus 300 distributes the disk media storage 400 for a purpose of an advertisement, the viewer identification information may be differentiated according to a distribution site of the disk media storage 400. The content providing apparatus 300 may then analyze the viewer identification information to easily obtain the statistics on the transmission of the multimedia content.

The content reception information may also include a content identification information corresponding a specific multimedia content of the plurality of multimedia contents.

The communication interface 230 transmits the content identification information to the content providing apparatus 300 and receives the multimedia content corresponding to the content identification information from the content providing apparatus 300.

Since the content reception information includes the content identification information, the disk media playback apparatus 200 may selectively receive and provide the multimedia content from the content providing apparatus 300.

In case that the content providing apparatus 300 stores a first advertisement content, a second advertisement content and a third advertisement content, an advertiser of the first advertisement content may insert the content identification information in the disk media storage 400 such that the user only can access the first advertisement content. When the user inserts the disk media storage 400 having the content identification information corresponding to the first advertisement content therein in the disk media playback apparatus 200, the disk media playback apparatus 200 may receive and provide the first advertisement content from the content providing apparatus 300.

On the other hand, the disk media playback apparatus 200 may further comprise the identification information storage 270 for storing a device identification information or a user identification information of the disk media playback apparatus.

The content providing apparatus 300 may require a basic information for the selection of the multimedia content in order to provide the personalized multimedia content.

For instance, the content providing apparatus 300 may carry out the selection based on the viewer identification information included in the content reception information. However, when the disk media storage 400 is distributed to the unspecific users, the content providing apparatus 300 cannot select the personalized multimedia content based on the viewer identification information included in the content reception information. Therefore, the identification information storage 270 may store the device identification information or the user identification information of the disk media playback apparatus 200.

The communication interface 230 transmits the device identification information or the user identification information to the content providing apparatus 300, and receives the multimedia content selected based on the device identification information or the user identification information from the content providing apparatus 300.

The content providing apparatus 300 may also check a regional information on a location of the disk media playback apparatus 200 based on the device identification information. For instance, when the device identification information is the network identification information of the disk media playback apparatus 200, the content providing apparatus 300 may check the regional information through the disk media playback apparatus 200.

The content provider 250 processes and provides the multimedia content received through the communication interface 230. For instance, the content provider 250 processes the multimedia content to be displayed on a display device connected to the disk media playback apparatus 200.

The multimedia content may include a data application. For instance, the data application is supported when the disk media playback apparatus 200 supports HDi (High Definition interactive) or BD-J. HDi is a standard specification for a data application service and an advanced user menu function supported by HD-DVD. BD-J is a standard specification for a data application service supported by Blu-ray disk.

The disk media playback apparatus 200 may embody and provide the data application using an interactive service specification for a disk media such as HDi or BD-J.

That is, the content provider 250 may execute and provide the data application received through the communication interface 230 from the content providing apparatus 300.

In order to improve an efficiency when providing the data application in the content provider 250, the data application may include a scene resource data independently executable scene-by-scene. That is, when a size of the data application is excessively large, it is difficult for the communication interface 230 to receive the data application or for the content provider 250 to process the data application. Therefore, the data application may include a plurality of scene resource data divided according to scenes.

The scene resource data is for the scene-by-scene execution of the data application and may include an execution code that may be executed scene-by-scene and a resource data. The resource data may include a background image, an image of a button of the user interface and a data such as a text.

When the data application is stored in the content providing apparatus 300 in a form of the scene resource data, the content providing apparatus 300 may transmit the data application to the disk media playback apparatus 200 in a unit of the scene resource data.

The communication interface 230 receives the scene resource data and the content provider 250 executes and provides the scene resource data received by the communication interface 230.

When the scene resource data is employed, a limitation of a size of the data application in order to facilitate the reception and the execution thereof may be minimized. Therefore, the communication interface 230 may provide the data application having various functions through the communication interface 230 and the content provider 250.

Figure 4:
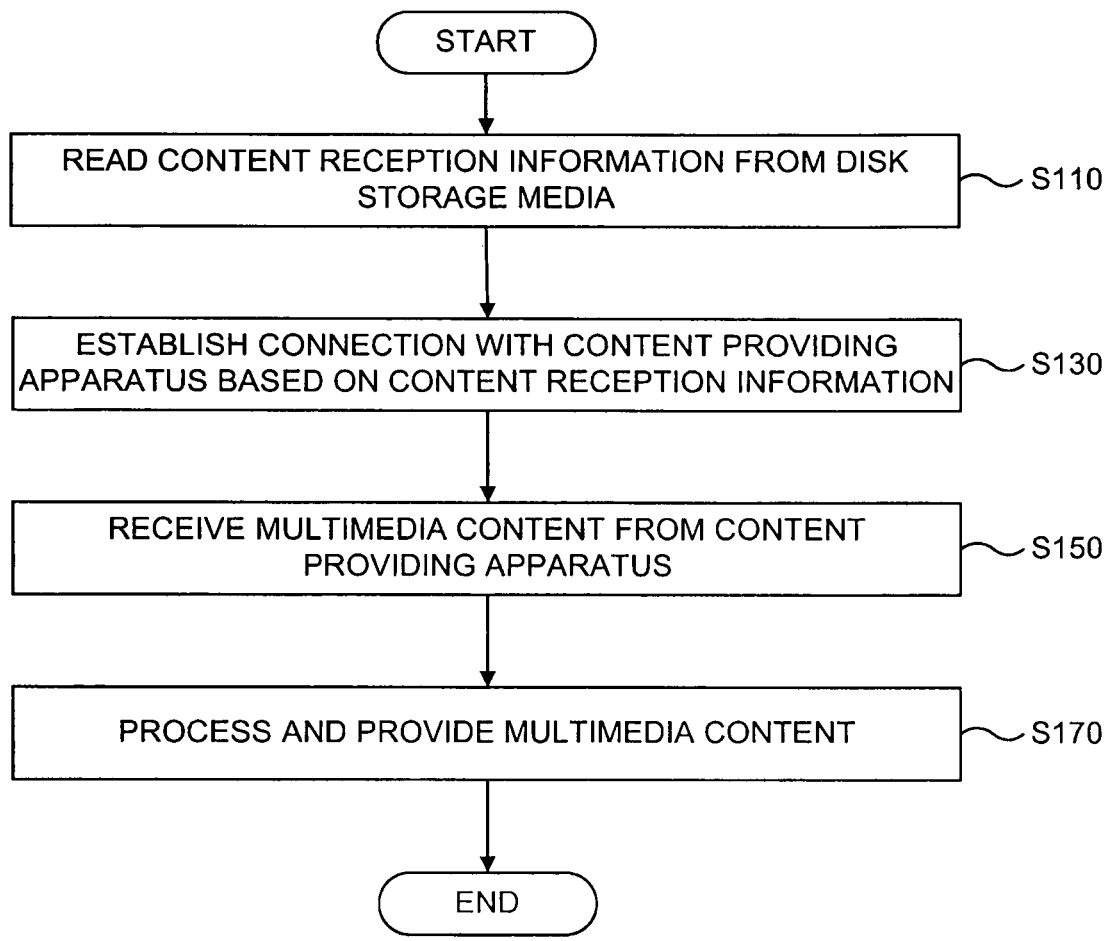
FIG. 4 is a flow diagram exemplifying a method for providing a multimedia content using a disk media playback apparatus in accordance with the present invention.

FIG. 4 is a flow diagram exemplifying a method for providing a multimedia content using a disk media playback apparatus in accordance with the present invention. Since the method illustrated in FIG. 4 is embodied in the apparatus described with reference to FIGS. 2 and 3, and the method is described with reference to FIGS. 2 through 4.

Referring to FIGS. 2 through 4, the disk media playback apparatus 200 receives the content reception information from the disk media storage 400 (S110).

The content reception information is the information required for the disk media playback apparatus 200 to receive the multimedia content from the content providing apparatus 300. For instance, the content reception information may include at least one of the network identification information, the authentication information and the viewer identification information.

The disk media storage 400 may support a disk media storage specification such as a DVD specification, a Blu-ray specification and a HD-DVD specification.

Thereafter, the disk media playback apparatus 200 establishes the communication connection with the content providing apparatus 300 based on the content reception information read in the step S110 (S130).

When the content reception information includes the network identification information of the content providing apparatus 300, the disk media playback apparatus 200 establishes the communication connection based on the network identification information of the content providing apparatus 300.

When the content reception information includes the authentication information of the content providing apparatus 300, the disk media playback apparatus 200 transmits the authentication information to the content providing apparatus 300.

The content providing apparatus 300 may then carry out the user verification based on the authentication information.

When the content reception information includes the viewer identification information, the content providing apparatus 300 may transmit the viewer identification information to the content providing apparatus 300. The content providing apparatus 300 may select and transmit the multimedia content suitable for the viewer based on the viewer identification information.

Although not shown, in accordance with the method of the present invention, the user identification information or the device identification information of the disk media playback apparatus may be stored for the selection of the multimedia content in the content providing apparatus 300. That is, the user identification information or the device identification information is stored in the disk media playback apparatus 200, and the disk media playback apparatus 200 transmits the user identification information or the device identification information when connected to the content providing apparatus 300. The content providing apparatus 300 selects and transmits the multimedia content suitable for the disk media playback apparatus 200 based on the user identification information or the device identification information.

In addition, the content reception information may include the content identification information. The content identification information is an identification information on one of the plurality of multimedia contents stored in the content providing apparatus 300.

The disk media playback apparatus 200 transmits the content identification information read from the disk media storage 400 to the content providing apparatus 300. The content providing apparatus 300 selects one of the plurality of multimedia contents corresponding to the content identification information transmitted from the disk media playback apparatus 200 and transmits the selected multimedia content to the disk media playback apparatus 200.

Thereafter, the multimedia content is received from the content providing apparatus 300 (S150).

Thereafter, the multimedia content received in the step S150 is processed and provided (S170).

The multimedia content may include the data application.

When the disk media playback apparatus 200 supports HDi (High Definition interactive) or BD-J, the disk media playback apparatus 200 may provide the data application.

In order to improve an efficiency when providing the data application in the disk media playback apparatus 200, the data application may include a scene resource data independently executable scene-by-scene. That is, when a size of the data application is excessively large, it is difficult for the disk media playback apparatus 200 to receive the data application or to process the data application. Therefore, the data application may include a plurality of scene resource data divided according to scenes.

The scene resource data is for the scene-by-scene execution of the data application and may include an execution code that may be executed scene-by-scene and a resource data. The resource data may include a background image, an image of a button of the user interface and a data such as a text.

When the data application is stored in the content providing apparatus 300 in a form of the scene resource data, the content providing apparatus 300 may transmit the data application to the disk media playback apparatus 200 in a unit of the scene resource data.

The disk media playback apparatus 200 may receive the data application by unit of the scene resource data and may execute and provide the scene resource data.

When the scene resource data is employed, a limitation of a size of the data application in order to facilitate the reception and the execution thereof may be minimized. Therefore, the disk media playback apparatus 200 may provide the data application having various functions.

Accordingly, the step S150 may comprise receiving the scene resource data.

When the scene resource data is received, the step S170 comprises processing and providing the scene resource data received in the step S150.

As described above, in accordance with the present invention, the multimedia content may be provided to the user via the disk media playback apparatus. In addition, since the multimedia content may be provided using the content reception information stored in the disk storage media, the present invention is applicable to various fields. For instance, when a company which markets to consumers distributes the disk storage media that holds a link to the content providing apparatus of the company, the consumers may receive the multimedia content provided by the company by inserting the disk storage media into the disk media playback apparatus at home. Therefore, an advertisement or a promotion of a product is facilitated. In addition, the present invention may be applied to a remote education or public relations as well as the advertisement or the promotion.

While the present invention has been particularly shown and described with reference to the preferred embodiment thereof, it will be understood by those skilled in the art that various changes in form and details may be effected therein without departing from the spirit and scope of the invention.

What is claimed is:

1. A method for providing a multimedia content using a disk media playback apparatus, the multimedia content comprising video data, audio data and a data application, the method comprising steps of:
   (a) reading a content reception information from a disk media storage by the disk media playback apparatus;
   (b) after step (a), sending, by the disk media playback apparatus, the content reception information to a content providing apparatus, and then transmitting, by the content providing apparatus, the multimedia content to the disk media playback apparatus based on the content reception information that is received from the disk media playback apparatus by the content providing apparatus, wherein the disk media playback apparatus is different from the content providing apparatus;
   (c) receiving the multimedia content from the content providing apparatus including the data application divided into a plurality of scene resource data independently executable scene-by-scene, wherein each of the plurality of the scene resource data includes an execution code and a resource data, wherein the data application is transmitted in a unit of the scene resource data to the disk media playback apparatus; and
   (d) providing the video data and the audio data included in the multimedia content received in the step (c) and processing the data application included in the multimedia content received in the step (c) by independently executing the plurality of scene resource data scene-by-scene, the data application being executable by the disk media playback apparatus,
   wherein the content reception information includes a viewer identification information to be used for statistics at the content providing apparatus when the multimedia content is provided to unspecific users,
   wherein the disk media storage is distributed from the content providing apparatus,
   wherein the viewer identification information is differentiated according to a distribution site of the disk media storage, and
   wherein the content providing apparatus analyzes the viewer identification information to obtain the statistics on transmission of the multimedia content.

2. The method in accordance with claim 1, wherein the content reception information includes a network identification information of the content providing apparatus, and
   wherein the step (b) comprises establishing the communication connection with the content providing apparatus based on the network identification information.

3. The method in accordance with claim 1, wherein the content reception information includes an authentication information,
   wherein the step (b) comprises transmitting the authentication information to the content providing apparatus.

4. The method in accordance with claim 1, wherein the content reception information includes a viewer identification information, and
   wherein the step (b) comprises transmitting the viewer identification information to the content providing apparatus.

5. The method in accordance with claim 1, further comprising (e) storing a device identification information or a user identification information of the disk media playback apparatus, and
   wherein the step (b) comprises transmitting the device identification information or the user identification information to the content providing apparatus.

6. The method in accordance with claim 1, wherein the content reception information includes a content identification information of the multimedia content, and
   wherein the step (b) comprises transmitting the content identification information to the content providing apparatus.

7. The method in accordance with claim 1, wherein the disk media storage supports one of a DVD specification, a Blu-ray specification and a HD-DVD specification.

8. The method in accordance with claim 1, wherein the data application is a series of execution codes that is executable by the disk media playback apparatus.

9. The method in accordance with claim 4, wherein the disk media storage supports one of a DVD specification and a Blu-ray specification.

10. The method in accordance with claim 4, wherein the disk media storage is an optical recording medium.

11. The method in accordance with claim 6, wherein the content providing apparatus stores an advertisement content from the content providing apparatus and provides the advertisement content when the content identification information corresponds to the advertisement content.

12. The method in accordance with claim 11, wherein the content identification information is stored in the disk media storage.

\* \* \* \* \*